United States Patent [19]
Onimaru et al.

[11] Patent Number: 5,860,499
[45] Date of Patent: Jan. 19, 1999

[54] POWER TAKE OFF DEVICE FOR AN AUTOMATIC TRANSMISSION

[75] Inventors: Yoshiyuki Onimaru, Nagoya; Suguru Futamura, Toyokawa; Kokichi Kato, Nagoya, all of Japan

[73] Assignee: Aisin Seiki Kabushiki Kaisha, Kariya, Japan

[21] Appl. No.: 870,491

[22] Filed: Jun. 6, 1997

[30]  Foreign Application Priority Data

Jun. 7, 1996 [JP] Japan .................................. 8-145871

[51] Int. Cl.$^6$ ............................. F16H 61/14; B60K 41/22
[52] U.S. Cl. ..................... 192/3.3; 74/15.86; 192/3.63; 475/66
[58] Field of Search ..................... 192/3.3, 3.63; 477/130; 74/15.86; 475/65, 66, 295

[56]  References Cited

U.S. PATENT DOCUMENTS 4,191,072  3/1980  Ehrlinger et al. ...................... 475/68
4,815,341  3/1989  Ohkubo et al. ........................ 477/134
5,007,309  4/1991  Lemon et al. ..................... 192/3.58 X

FOREIGN PATENT DOCUMENTS 62-4965  1/1987  Japan .
6-74848  9/1994  Japan .

*Primary Examiner*—Rodney H. Bonck
*Attorney, Agent, or Firm*—Burns, Doane, Swecker 7 Mathis, LLP

[57]  ABSTRACT

A power take off device for an automatic transmission for taking off auxiliary power has a power take off switch which turns on the power take off device. The automatic transmission includes a torque converter and a lock-up clutch. The torque converter is connected to the power take off device when the power take off switch is turned on. The automatic transmission includes a lock-up control valve operating the lock-up clutch and a 1-2 shift valve for changing gear speed from a first stage to a second stage. The 1-2 shift valve supplies line pressure to the lock-up control valve when the shift lever is in the neutral position or the parking position and cuts off line pressure supplied to the lock-up control valve when the 1-2 shift valve is in the first stage.

14 Claims, 4 Drawing Sheets

POWER TAKE OFF DEVICE FOR AN AUTOMATIC TRANSMISSION

FIELD OF THE INVENTION

The present invention generally relates to automatic transmissions, and more particularly pertains to a power take off device for an automatic transmission having a torque converter.

BACKGROUND OF THE INVENTION

In general, passenger cars which employ an automatic transmission of the hydraulic type have a torque converter on board. On the other hand, special motor vehicles used for specific purposes, such as a dump trucks or fire engines, employ a power take off device with the transmission system for supplying auxiliary power for functions other than moving the vehicle.

A conventional power take off device for an automatic transmission has been proposed in Japanese Patent Publication No. 6(1994)-74848. This publication discloses a lock-up control device that locks up the transmission when a power take off device is turned on while a shift lever position is in the P (parking) position or the N (neutral) position. Accordingly, it is possible to effectively use the engine power.

However, in this device, in situations where the solenoid valve or the lock-up control valve does not operate because of a valve sticking while the transmission is locked up, the lock-up condition is kept on even if the power take off switch is turned off. In the above situation, when the shift lever is moved from the P (parking) position to the D (drive) position for running the vehicle, the transmission changes the gears from the neutral stage to the first stage. The engine may stop because of the large shock to the engine that is caused by the lock-up condition of the transmission.

SUMMARY OF INVENTION

A need exists, therefore for a power take off device for an automatic transmission which overcomes the above drawbacks.

In order to address this need, a power take off device for an automatic transmission for taking out auxiliary power from the engine has a power take off switch which turns on the power take off device. The automatic transmission includes a torque converter and a lock-up clutch. A modulating valve controls line pressure in the automatic transmission. The torque converter is connected to the power take off device when the power take off switch is turned on. The automatic transmission includes a lock-up control valve for operating the lock-up clutch and a 1-2 shift valve for changing gear speeds from the first stage to the second stage. The 1-2 shift valve supplies line pressure to the lock-up control valve when the shift lever is in the neutral position or the parking position. The 1-2 shift valve cuts off line pressure supplied to the lock-up control valve when the 1-2 shift valve is in the first stage.

In accordance with the present invention, the 1-2 shift valve supplies line pressure to the lock-up control valve when the shift lever is in the neutral position or the parking position so that the torque converter can be locked up when the power take off switch is turned on. The power take off device is also connected to the torque converter to take out auxiliary power. When the power take off switch is turned off and the shift lever is moved into the drive position, the 1-2 shift valve cuts off the line pressure from the modulating valve.

BRIEF DESCRIPTION OF THE DRAWING FIGURES

Additional features and aspects of the present invention will become more readily apparent from the following detailed description of a preferred embodiment considered with reference to the accompanying drawing figures in which like elements are designated by like reference numerals and wherein.

DETAILED DESCRIPTION OF THE PREFERRED EMBODIMENTS

A power take off device for an automatic transmission in accordance with a preferred embodiment of the present invention will be described with reference to the accompanying drawing figures. In this embodiment, the automatic transmission has 4 gear speeds including an overdrive gear speed.

Figure 1:
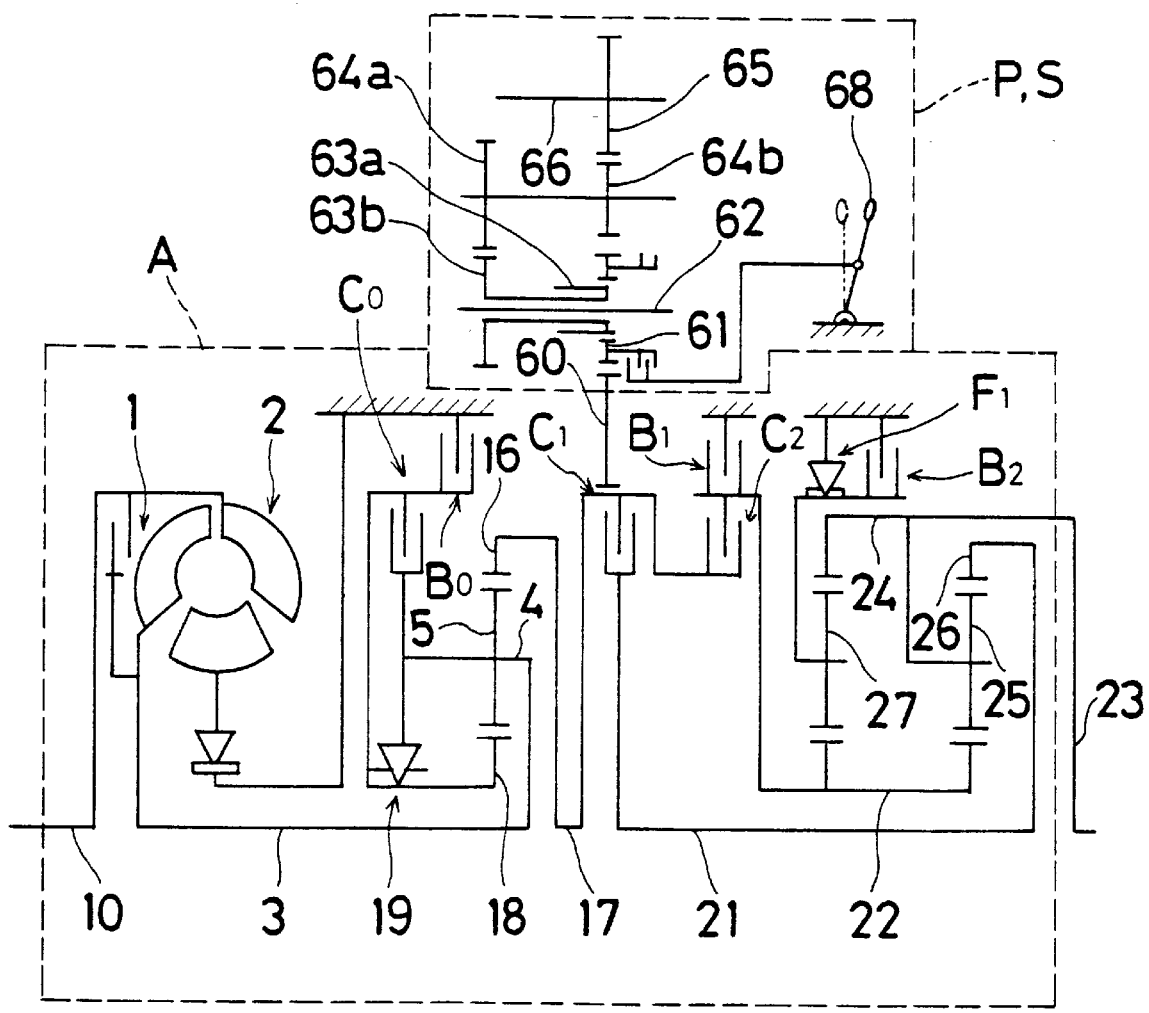
FIG. 1 is a schematic illustration of the gear train of the automatic transmission of the present invention.
Figure 2:
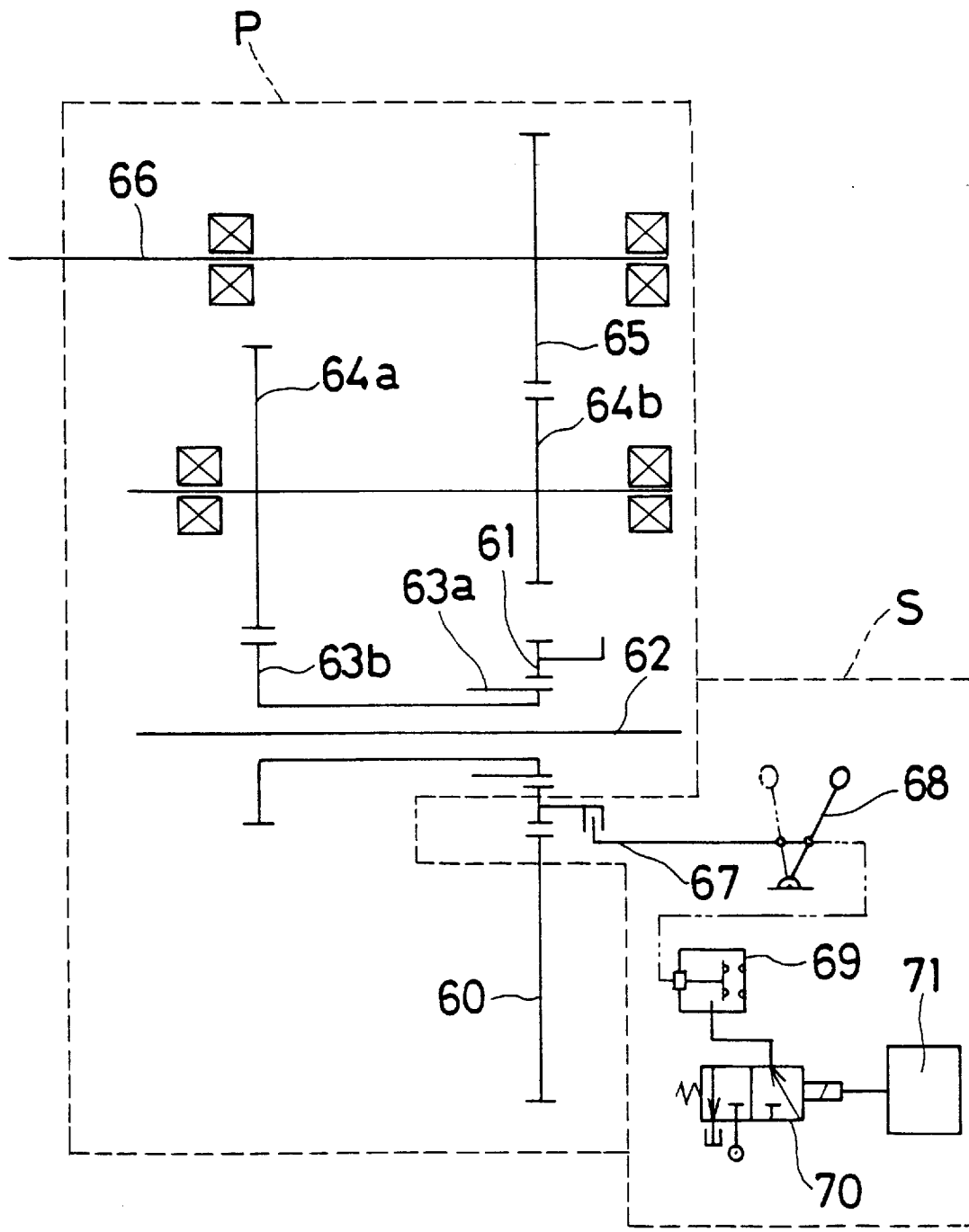
FIG. 2 is an enlarged detail view of a portion of the gear train depicted in FIG. 1.

As seen with reference to FIG. 2, a power take off (PTO) device includes a power take off (PTO) gear device P and a power take off (PTO) operating device S. The PTO gear device P includes an input gear 60 which is connected to the clutch C1 of a planetary gear unit as shown in FIG. 1, intermediate gear couples 63a, 63b which are set on an intermediate shaft 62 to engage the input gear 60 through a connecting gear 61 of the PTO operating device S, ring gears 64a, 64b which engage the intermediate gear 63b, an output gear 65 which engages the ring gear 64b, and an output shaft 66 of the output gear 65. The intermediate gear couples 63a, 63b are rotatable with the intermediate shaft 62.

The PTO operating device S includes the connecting gear 61, a shift lever 67 which shifts the connecting gear 61, a PTO operating lever 68 connected with the shift lever 67, an actuator 69 which moves the PTO operating lever 68, and a solenoid valve 70 which controls the movement of the actuator 69 by supplying oil pressure. The actuator has a diaphragm and a spring. A power take off switch 71 is connected to the solenoid valve 70.

When the power take off switch 71 is turned on, the solenoid valve 70 is turned on. The solenoid moves to supply oil pressure to the actuator 69 so that the diaphragm of the actuator 69 is moved against the spring in order to pull the PTO operating lever 68. The PTO operating lever 68 is moved to the position indicated by the solid line in FIG. 2 by movement of the actuator 69. The shift lever 67 is moved by the PTO operating lever 68 to engage the input gear 60 with the intermediate gear 63a through the connecting gear 61. The output shaft 66 of the PTO device P is engaged with the clutch C1 through the intermediate gear couples 63a, 63b, the ring gears 64a, 64b, and the output gear 65. Therefore, the output shaft 66 can take auxiliary power from the engine.

When the power take off switch 71 is turned off, the solenoid valve 70 is turned off. The solenoid valve 70 thus discharges oil pressure in the actuator 69. The actuator 69 returns to the original position and the PTO operating lever 68 returns to the original position. The output shaft 66 of the PTO device is disengaged from the clutch C1 of a planetary gear unit.

With reference to FIG. 1, the features associated with the automatic transmission A will be explained. A turbine shaft 3 is connected with a crankshaft 10 of the engine (not shown) through a torque converter 2. The torque converter 2 has a lock-up clutch 1 which directly connects the crankshaft 10 (input shaft) with a turbine shaft 3 (output shaft). The turbine shaft 3 is connected with a carrier 4 of a planetary transmission. A planetary pinion 5 that is rotatably supported by the carrier 4 is connected with the first intermediate shaft 17 through a planetary gear 16. The planetary pinion 5 engages a sun gear 18. A one-way clutch 19 and an over-drive clutch C0 are located between the sun gear 18 and the carrier 4. An over-drive brake B0 is located between the sun gear 18 and the housing 20. A forward clutch C1 is located between the first intermediate shaft 17 and the second intermediate shaft 21. A direct clutch C2 is located between the first intermediate shaft 17 and a sun gear shaft 22. A second brake B1 is located between the sun gear shaft 22 and the housing 20. A planetary pinion 25 rotatably supported on a carrier 24 which is connected with an output shaft 42 is connected with the second intermediate shaft 21 through a carrier 26. The planetary pinion 25 engages the sun gear shaft 22. A planetary pinion 27 engages the carrier 24 with the sun gear shaft 22. A reverse brake B2 and an one-way clutch F1 are located between the planetary pinion 27 and the housing 20.

Table 1 below shows the engagement and disengagement of the clutches C0, C1, C2 and the brakes B0, B1, B2 in the automatic transmission. In the table, O represents engagement while X represents disengagement.

TABLE 1

|   |    | C0 | C1 | C2 | B0 | B1 | B2 |
|---|----|----|----|----|----|----|----|
| P |    | O  | X  | X  | X  | X  | X  |
| R |    | O  | X  | O  | X  | X  | O  |
| N |    | O  | X  | X  | X  | X  | X  |
| D | 1  | O  | O  | X  | X  | X  | X  |
|   | 2  | X  | O  | X  | X  | O  | X  |
|   | 3  | O  | O  | O  | X  | X  | X  |
|   | OD | X  | O  | O  | O  | X  | X  |
| 2 | 1  | O  | O  | X  | X  | X  | X  |
|   | 2  | O  | O  | X  | X  | O  | X  |
|   | 3  | O  | O  | O  | X  | X  | X  |
| L | 1  | O  | O  | X  | X  | X  | O  |
|   | 2  | O  | O  | X  | X  | O  | X  |
|   | 3  | O  | O  | O  | X  | X  | X  |

Figure 4:
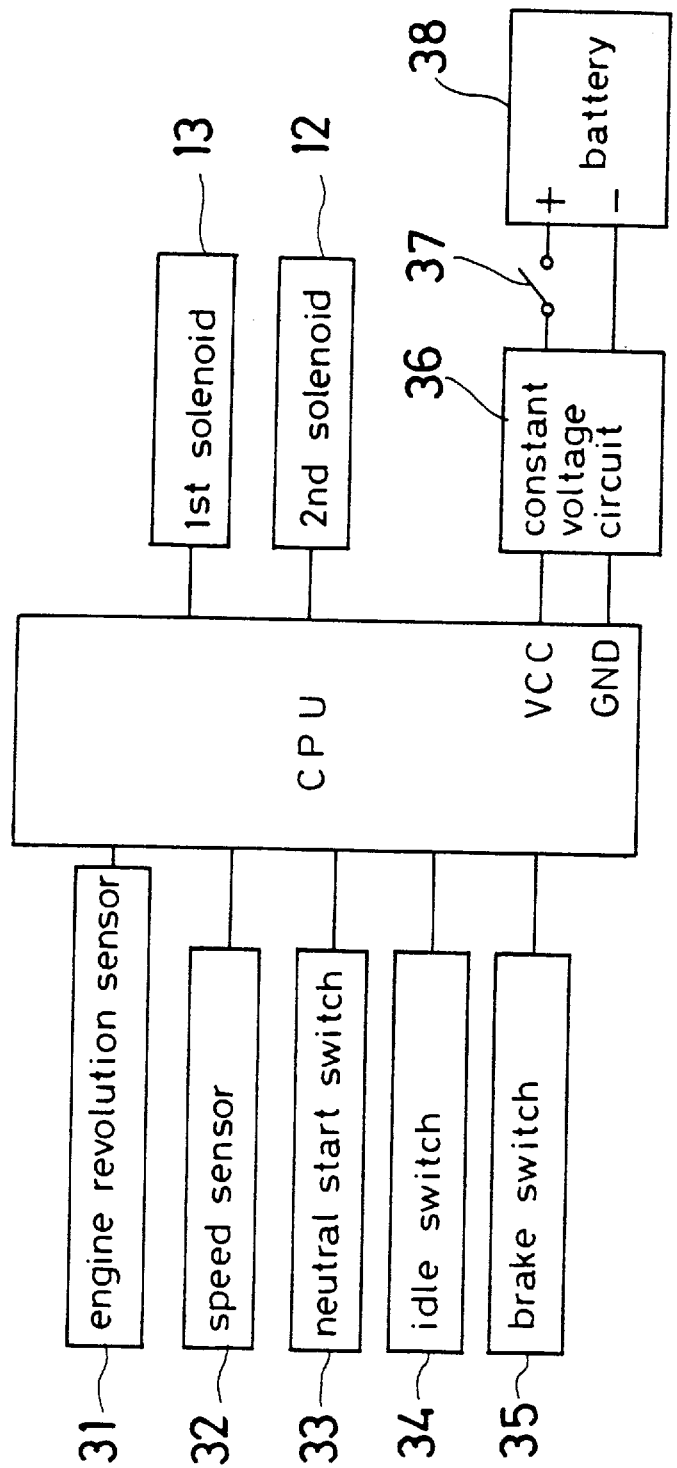
FIG. 4 shows a block diagram of the electric control system utilized in the present invention.

The clutches C0, C1, C2 and the brakes B0, B1, B2 are operated by the oil pressure circuit controlled by the electric control circuit ECU shown in FIG. 4. The electronic control circuit controls the turning on or off of the first solenoid 13 and the solenoid 12.

The electric control circuit judges the shift speed of the automatic transmission corresponding to the position of the shift lever, and controls the engagement and disengagement of the clutches and the brakes based on Table 2 below. The electric control circuit also controls operation of the PTO device.

TABLE 2

| shift stage | disengage side | engage side |
|-------------|----------------|-------------|
| 2→1         | B1             | C0          |
| 3→1         | C2             |             |
| OD→1        | B0,C2          | C0          |
| N→1         |                | C1          |
| R→1         | C2,B2          | C1          |

TABLE 2-continued

| shift stage | disengage side | engage side |
|-------------|----------------|-------------|
| 3→2         | C2             | B1          |
| OD→2        | B0,C2          | B1          |
| N→2         | C0             | B1,C1       |
| R→2         | B2,C0,C2       | B1,C1       |
| OD→3        | B0             | C0          |
| N→3         |                | C1,C2       |
| R→3         | B2             | C1          |
| N→OD        | C0             | B0,C1,C2    |
| R→OD        | B2,C0          | C2,B1       |
| R→N         | B2,C2          |             |

FIG. 4 is a block diagram of the electric control circuit utilized in the present invention. The terminals of a battery 38 are connected to the input terminals of a constant voltage circuit 36 through an ignition switch 37. The output terminals of the constant voltage circuit 36 are connected to the power source termiinals of VCC and GND. The constant voltage circuit 36 regulates the voltage of the battery to a predetermined constant voltage.

The input terminals of the central processing unit CPU are connected to an engine revolution sensor 31, a speed sensor 32, a neutral start switch 33, an idle switch 34 and a brake switch 35. The input interfaces have not been specifically shown in FIG. 4.

The engine revolution sensor 31 detects the revolution of the engine, while the speed sensor 32 detects the speed of the vehicle. The neutral start switch 33 detects the position of the shift lever in the D (drive) position, the L (low) position, the 2 (second) position, the 3 (third) position, the N (neutral) position, the R (reverse) position or the P (parking) position. Finally, the idle switch 34 detects the idle condition of the engine, while the brake switch 35 detects whether the brake is applied.

The output terminals of the central processing unit CPU are connected to the first solenoid 13 and the second solenoid 12. The central processing unit CPU sends signals to the first solenoid valve 13 when the PTO switch 71 is operated.

The system includes solenoids for controlling the clutches C0, C1, C2 and the brakes B0, B1, B2. These solenoids have not been specifically illustrated in FIG. 4.

Figure 3:
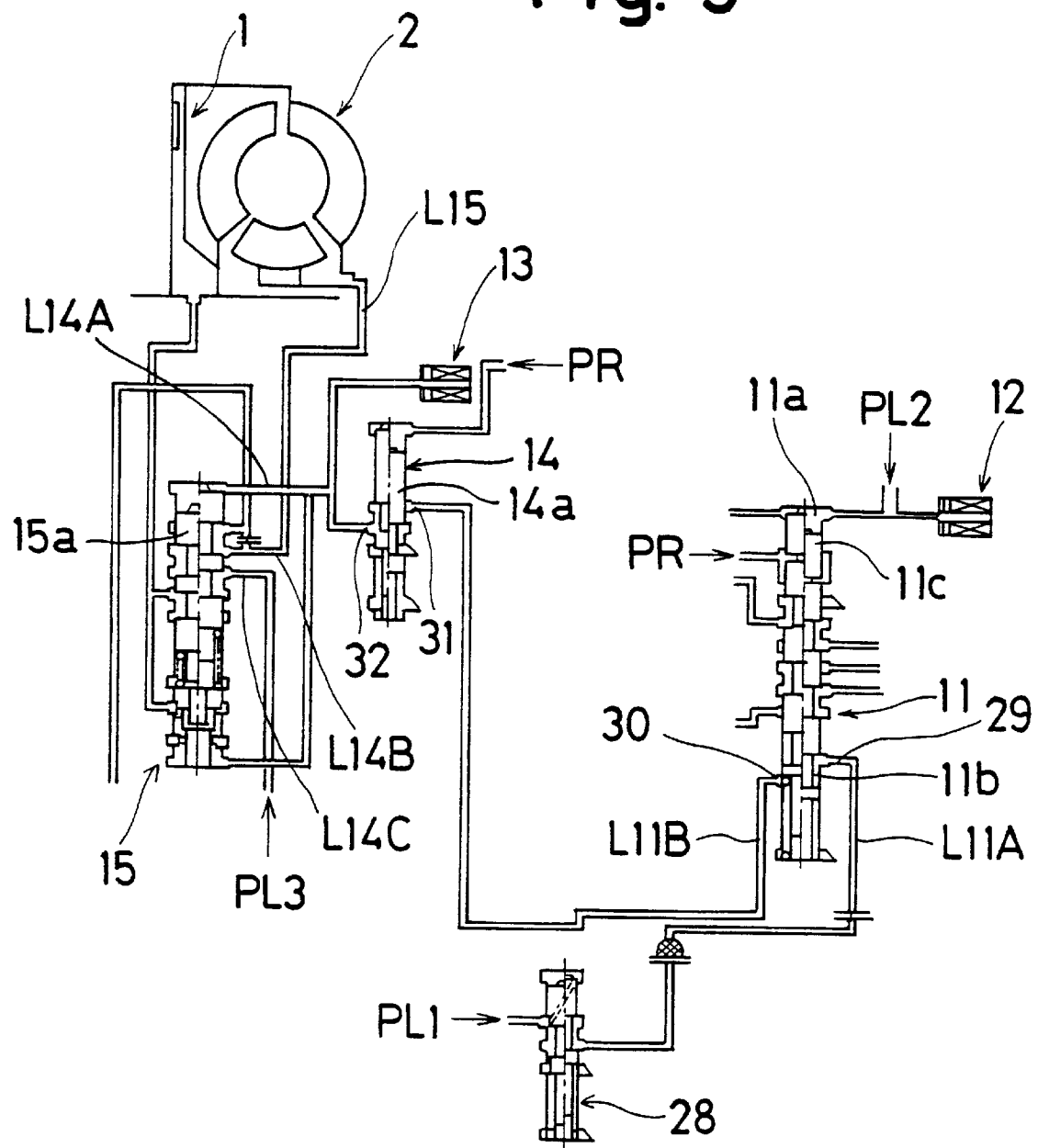
FIG. 3 is a schematic illustration of the oil pressure circuit of the automatic transmission of the present invention.

The lock-up operation of the present invention is explained below with reference to FIG. 3. When the shift lever is positioned in the P (parking) position or the N (neutral) position, the second solenoid 12 is turned on to the closed position and line pressure PL2 is supplied to a chamber 11a. A spool 11c of the 1-2 shift valve 11 is pushed downwardly in FIG. 3. This condition is shown at the right side of the 1-2 shift valve 11 in FIG. 3. Line pressure PL1 is supplied to the first port 29. The second port 30 is connected to the first port 29 through the chamber 11b so that an oil line L11A is connected to an oil line L11B. The value of the line pressure PL1 is tuned by the modulating valve 28 and is supplied to the lock-up signal valve 14. The lock-up signal valve 14 is not operated downwardly when a reverse pressure PR from a manual shift valve (not shown) is applied.

The line pressure PL1 is supplied to the third port 41 of the lock-up signal valve 14 and is supplied to the lock-up control valve 15 through the fourth port 42. When the first solenoid 13 is turned on, oil pressure from the oil line L11A pushes the spool 15a of the lock-up control valve 15. This condition of the lock-up control valve 15 is shown at the left side of the lock-up control valve 15 in FIG. 3. In this situation, the lock-up clutch 1 begins to operate by oil pressure supplied by the oil line L11B and oil pressure from line pressure PL3. The lock-up clutch 1 does not operate when the first solenoid 13 is turned off. The lock-up operation for the PTO device is performed when the power take off switch 71 is turned on.

When the shift lever is positioned in the R (reverse) position, the second solenoid 12 is turned off. The reverse pressure PR is supplied to the 1-2 shift valve 11 and the spool 11c is pushed downwardly. The line pressure from the modulating valve 28 is connected with the lock-up signal valve 14 through the 1-2 shift valve 11. However the line pressure passing through the modulating valve 28 is not supplied to the oil line L14A, because the spool 14a of the lock-up signal valve 14 is pushed downwardly by the reverse pressure PR. Therefore, line pressure is not supplied to the lock-up control valve 15. The lock-up clutch 1 does not operate regardless of the on or off condition of the first solenoid 13.

When the gear speed is in the 1 stage while the shift lever is in the D (drive) position, the spool 11c maintains its up position, since the second solenoid 12 is turned off. The line pressure PL1 is supplied to the oil line L11A through the modulating valve 28. Because the oil lines L11B and L11A are shut off by the spool 11c, oil pressure from the modulating valve 28 is not supplied to the lock-up control valve 15. The lock-up clutch 1 does not operate regardless of the on or off condition of the first solenoid 13.

When the gear speed is in the 2 stage or 3 stage while the shift lever is in the D (drive) position, it is the same lock-up operation as the operation of the shift lever being in the P (parking) or the N (neutral) position.

When the gear speed is in the 4 stage while the shift lever is in the D (drive) position, the spool 11c is pushed downwardly by the drive pressure (not shown) supplied to the 1-2 shift valve 11. The line pressure PL1 through the modulating valve 28 is supplied to the oil line L11B in spite of the second solenoid 12 being turned off. When oil pressure passing through the oil line L11B is supplied to the lock-up control valve 15, the lock-up clutch 1 is controlled by the condition of the first solenoid 13.

When the gear speed is in the 2 stage or the low stage, it is the same lock-up operation as the operation of the shift lever being in the D (drive) position.

In accordance with the present invention, the PTO device takes engine power for purposes other than running the vehicle by locking up the torque converter when the shift lever is positioned in the P (parking) position or the N (neutral) position. When the use of the PTO device ceases, the shift lever is moved into the D (drive) position for running the vehicle. When the gear speed is in the first stage, the transmission cuts the line pressure from the modulating valve to the lock-up clutch in order to release the lock-up clutch. Therefore, even if a valve stick occurs in the first solenoid when the PTO device is used, the lock-up condition of the torque converter is released when the shift lever is moved into the D (drive) position.

In accordance with the present invention, when the shift position is the R (reverse) position, oil pressure is not supplied to the lock-up control valve 15 by operation of the spool of the lock-up signal valve 1. Therefore, even if the first solenoid valve malfunctions when the shift lever is positioned in the R (reverse) position after using the PTO device, the lock-up condition is released to make the vehicle run without experiencing an engine stall.

The principles, a preferred embodiment and modes of operation of the present invention have been described in the foregoing description. The invention which is intended to be protected herein should not, however, be construed as limited to the particular forms disclosed, as these are to be regarded as illustrative rather than restrictive. Variations and changes may be made by those skilled in the art without departing from the spirit of the present invention. Accordingly, the foregoing detailed description should be considered exemplary in nature and not limited to the scope and spirit of the invention as set forth in the appended claims.

What is claimed is:

1. An automatic transmission comprising:
   a power take off device for taking off auxiliary power;
   a power take off switch;
   a torque converter having an input shaft connectable to an engine, an output shaft connectable to an automatic transmission, and a lock-up clutch which directly connects the input shaft with the output shaft, the output shaft being connectable to the power take off device when the power take off switch is turned on;
   a modulating valve for controlling line pressure in the automatic transmission;
   a lock-up control valve for operating the lock-up clutch to connect the input shaft and the output shaft;
   a 1-2 shift valve for changing a gear stage from a first stage to a second stage, the 1-2 shift valve supplying line pressure to the lock-up control valve when a shift lever is in a neutral position or a parking position, the 1-2 shift valve cutting off line pressure from the modulating valve when the 1-2 shift valve is in the first stage;
   a solenoid operatively connected to the lock-up control valve for supplying line pressure to the lock-up control valve from the 1-2 shift valve when the power take off switch is turned on and the shift lever is in the neutral position or the parking position.

2. An automatic transmission as recited in claim 1, wherein the 1-2 shift valve has a first port connected to the modulating valve, a second port connected with the lock-up control valve and a spool which connects the first port with the second port when the shift lever is in the neutral position or the parking position so that line pressure is supplied to the lock-up control valve.

3. An automatic transmission as recited in claim 1, including a lock-up signal valve which shuts off line pressure from the 1-2 shift valve to the lock-up control valve when the shift lever is in a reverse position.

4. An automatic transmission as recited in claim 3, wherein the lock-up signal valve includes one port connected to the 1-2 shift valve and another port connected to the lock-up control valve.

5. An automatic transmission as recited in claim 1, wherein the solenoid is a first solenoid valve, and including a second solenoid valve operatively connected to the 1-2 shift valve.

6. An automatic transmission as recited in claim 1, wherein the power take off device includes a power take off gear device comprised of a plurality of gears and a power take off operating device.

7. An automatic transmission as recited in claim 6, wherein the power take off operating device includes an operating lever, an actuator for moving the operating lever and a solenoid valve for controlling movement of the actuator.

8. An automatic transmission comprising:
   a power take off device for taking off power;
   a power take off switch;
   a torque converter having an input shaft connectable to an engine, an output shaft connectable to the automatic transmission, and a lock-up clutch which connects the input shaft to the output shaft, the output shaft being connectable to the power take off device when the power take off switch is turned on;

a modulating valve for controlling line pressure;

a lock-up control valve for effecting operation of the lock-up clutch to connect the input shaft and the output shaft;

a 1-2 shift valve for changing from a first gear stage to a second gear stage, the 1-2 shift valve supplying line pressure controlled by the modulating valve to the lock-up control valve when a shift lever is in a neutral position or a parking position, the 1-2 shift valve cutting off line pressure from the modulating valve to the lock-up control valve when the 1-2 shift valve is in the first gear stage;

a solenoid valve operatively connected to the 1-2 shift valve for controlling line pressure from the modulating valve to the lock-up control valve, the solenoid valve preventing supply of line pressure from the modulating valve to the lock-up control valve by way of the 1-2 shift valve when the shift lever is in a drive position and the 1-2 shift valve is in the first gear stage.

9. An automatic transmission as recited in claim 8, wherein the 1-2 shift valve has a first port connected to the modulating valve, a second port connected to the lock-up control valve and a spool which connects the first port with the second port when the shift lever is in the neutral position or the parking position so that line pressure is supplied to the lock-up control valve.

10. An automatic transmission as recited in claim 8, including a lock-up signal valve disposed between the 1-2 shift valve and the lock-up control valve for shutting off line pressure from the 1-2 shift valve to the lock-up control valve when the shift lever is in a reverse position.

11. An automatic transmission as recited in claim 10, wherein the lock-up signal valve includes one port connected to the 1-2 shift valve and another port connected to the lock-up control valve.

12. An automatic transmission as recited in claim 8, including a solenoid valve operatively connected to the lock-up control valve for supplying line pressure to the lock-up control valve from the 1-2 shift valve when the power take off switch is turned on and the shift lever is in the neutral position or the parking position.

13. An automatic transmission as recited in claim 8, wherein the power take off device includes a power take off gear device comprised of a plurality of gears and a power take off operating device.

14. An automatic transmission as recited in claim 13, wherein the power take off operating device includes an operating lever, an actuator for moving the operating lever and a solenoid valve for controlling movement of the actuator.

* * * * *